United States Patent [19]

Mc Cormick

[11] Patent Number: 4,813,512

[45] Date of Patent: Mar. 21, 1989

[54] IDLER WHEEL ASSEMBLIES

[75] Inventor: Edward J. Mc Cormick, Greene, N.Y.

[73] Assignee: The Raymond Corporation, Greene, N.Y.

[21] Appl. No.: 61,479

[22] Filed: Jun. 15, 1987

[51] Int. Cl.[4] .............................................. B60K 17/30
[52] U.S. Cl. ..................................... 180/253; 280/95.1
[58] Field of Search ................... 280/688, 95 R, 670; 180/21, 65.1, 157, 163, 253; 414/785

[56] References Cited

U.S. PATENT DOCUMENTS

| | | | |
|---|---|---|---|
| 2,564,002 | 8/1951 | Gibson | 180/253 |
| 3,034,802 | 5/1962 | Axtmann | 280/694 |
| 3,204,980 | 9/1965 | Guerriero | 280/695 |
| 3,392,797 | 7/1968 | Gibson et al. | 180/253 |
| 3,727,938 | 4/1973 | Goodbary et al. | 180/253 |
| 4,447,072 | 5/1984 | Bradley et al. | 280/688 |
| 4,556,234 | 12/1985 | Mahnig et al. | 280/688 |

*Primary Examiner*—Richard A. Bertsch

[57] ABSTRACT

A vertically-sprung idler wheel of a lift truck is journaled near the outer end of an arm pivotally mounted for limited rotation about a substantially horizontal longitudinal axis, and spring means are provided to oppose rotation of the arm. The idler wheel may be linkage-steered or instead comprise a self-steered caster wheel. The assembly requires less space.

5 Claims, 4 Drawing Sheets

IDLER WHEEL ASSEMBLIES

This invention relates to material handling apparatus, and more particularly, to improved arrangements for mounting the unpowered rear wheel commonly used on narrow-aisle lift trucks. One class of narrow-aisle lift trucks employs a pair of unpowered non-steerable front wheels, or load wheels, a steerable powered drive wheel assembly rigidly mounted near one rear corner of the truck, and an unpowered vertically-sprung idler wheel assembly near the other rear corner of the truck. With all four wheels mounted on the same base frame, one wheel must be vertically sprung, or otherwise floor irregularities could result in loss of traction by the drive wheel.

In some applications the vertically-sprung idler wheel assembly uses a castered idler wheel which is self-steering. One early form of truck of that type is shown in U.S. Pat. No. 2,564,002. In various other applications the sprung idler wheel is not castered, but instead steered via a linkage. A truck of this latter type is shown in U.S. Pat. No. 3,392,797.

Significant economies can be achieved if vehicle frames of a uniform type may be made and then used with either a castered idler wheel or a linkage-steered idler wheel. Provision of an idler wheel mounting arrangement which will readily accommodate either type of steering is one object of the invention, although such a concept is not per se new, being disclosed in U.S. Pat. No. 3,392,797. In the idler wheel mounting arrangements disclosed in that patent, the pivot steering axis of the idler wheel must be located somewhat inwardly from a lateral extremity of the truck to allow space for a castered wheel to swing. The springs used to oppose weight on the idler wheel must be aligned with the pivot or steering axis, so that they do not impose moments which would cause undue bearing wear, and hence the springs also must be located undesirably inwardly from the lateral extremity of the truck, where they tend to interfere with provisions of an unobstructed operator compartment and waste space. A principal object of the present invention is to provide a sprung idler wheel mounting arrangement wherein the spring means used do not have to be laterally aligned with the idler wheel steering or pivot axis.

An attendant object of the invention is to provide an idler wheel mounting arrangement in which almost all of the parts used do not depend on which type of idler wheel steering is later selected.

Trucks using a linkage-steered idler wheel assembly may use a steering linkage arrangement of the type shown in U.S. Pat. No. 3,392,797 wherein a hydraulic ram pivots a rocker beam to steer the truck; or, alternatively, they may use an improved steering linkage arrangement disclosed in my copending application Ser. No. 044,356 filed Apr. 30, 1987, now U.S. Pat. No. 4,754,837 granted July 5, 1988. Another object of the invention is to provide an idler wheel assembly mounting arrangement which will accommodate either type of steering linkage arrangement.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 1 and 2 illustrate a preferred form of the invention installed on a truck with a steering linkage shown connected to steer the idler wheel.

Figure 2:
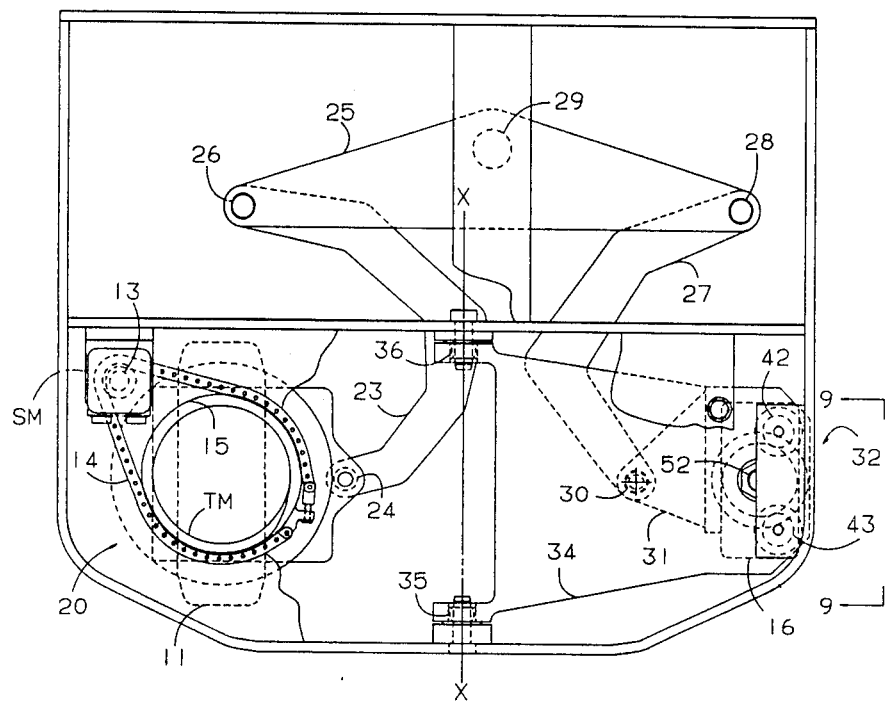
FIG. 2 is a downward section view taken at lines 2—2 in FIG. 1.

The left side of the rear of the truck is shown supported by a steerable powered drive wheel assembly 20 which is rotatably mounted on plate 21 (FIG. 1) rigidly affixed relative to the base frame of the truck. The drive wheel assembly includes an electric traction motor TM which drives drive wheel 11 through reduction gearing 12. Rotary motive means shown as comprising a rotary hydraulic steering motor SM is fixedly mounted relative to the base frame of the truck and is operated by a conventional operator control (not shown) in which an operator-controlled steering wheel positions a follower valve, causing rotation of steering motor SM in the direction of, and in an amount proportional to, steering wheel rotation. The shaft of motor SM carries a sprocket 13 which is connected via chain 14 (FIG. 2) to a sprocket member 15 formed on drive unit 20. Chain 14 is omitted from FIG. 1 for sake of clarity.

Drive wheel assembly 20 may comprise, for example, a powered steerable wheel unit of the nature shown in U.S. Pat. No. 3,392,797, with a sprocket 15 or gear added to such a unit to allow it to be rotated. One end of a rigid link 23 is pivotally attached to drive unit 20 via spherical bearing 24. The other end of link 23 is pivotally attached to one end of a bell crank or rocker member 25 via spherical bearing 26. A center portion of bell crank 25 is pivotally attached to the base frame of the truck via needle roller bearing 29. As powered drive wheel assembly 20 is rotated counterclockwise (as viewed in FIG. 2) from the position shown, it will be appreciated that link 23 will rotate bell crank 25 clockwise about bearing 29. One end of a link 27 is pivotally attached to bell crank 25 by spherical bearing 28, and the other end of link 27 is pivotally attached by spherical bearing 30 to an arm 31 affixed to a non-castered idler wheel assembly 32. As bell crank 25 rotates clockwise, idler wheel assembly 32 is rotated counterclockwise. The described steering linkage arrangement is not a part of the present invention, but instead, further described and claimed in my copending application Ser. No. 044,356 filed Apr. 30, 1987. It is to be understood that the idler wheel mounting arrangement of the present invention does not require such a steering linkage arrangement, nor indeed any linkage to steer the idler wheel.

The idler wheel assembly 32 is shown journalled by means of a roller thrust bearing 40 (FIG. 1) near the outer end of a rigid A-frame arm, or lever member 34, which is shown pivotally mounted on the base frame of the truck, near the lateral center of the truck, by trunnion bearings 35, 36, so that A-frame lever member 34 may rotate limited amounts about a horizontal longitudinally-extending axis x—x (FIG. 2). A pair of compression springs 42, 43 are shown interposed between the outer end of the A-frame lever member and a plate affixed to the base frame of the truck. Hence springs 42, 43 compress in accordance with the vertical weight imposed on the idler wheel, and as the truck travels over irregular floor surfaces the idler wheel may move upwardly and downwardly relative to the frame of the truck to insure that adequate weight to provide traction is always imposed on the powered drive wheel 11 of drive unit 20.

Figure 1:
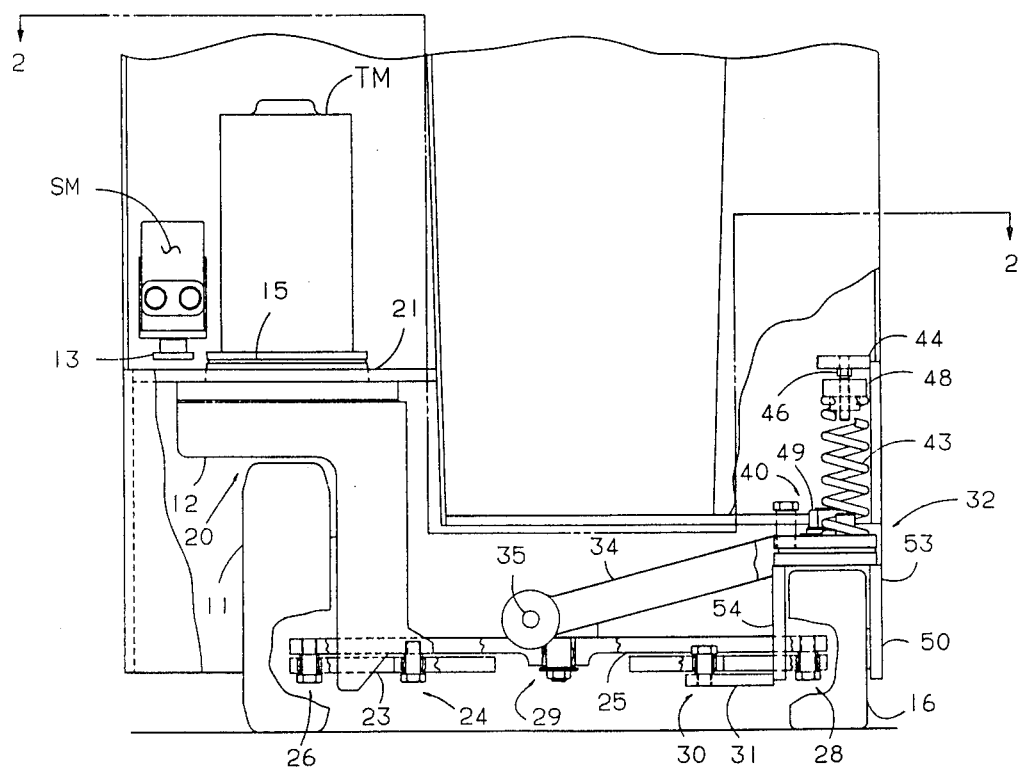
FIG. 1 is a rear elevation view of one form of lift truck incorporating a preferred form of the invention, with certain parts cut away and certain parts omitted for sake of clarity.

As floor surface irregularities cause the A-frame lever member 34 to rotate about axis x—x, the steering axis of the idler wheel assembly departs slightly from the vertical, and because the idler wheel steering shaft is journalled in lever member 34 for rotation about a fixed axis, the slight rotation of lever member causes floor contact of the idler wheel to vary between the inside and outside edges of the idler wheel tire. Constant running on the inside or outside edge of the idler wheel tire could cause unacceptable wear. However, because A-frame lever member 34 is long, i.e., pivoted a substantial lateral distance from the idler wheel tire, and because the pivot axis x—x of the A-frame lever member is very near the floor, the angular amount by which the idler wheel steering axis departs from the vertical is modest, and because appreciable rotation of lever member 34 occurs only when floor irregularities are encountered, the described arrangement results in acceptably little tire wear. Idler wheel assembly 32 includes an idler wheel 16 (shown partially cutaway in FIG. 1), and a vertical pivot or steering shaft 52 (FIG. 2). When the idler wheel assembly 32 is to be steered via a linkage, as shown in FIGS. 1 and 2, for example, that assembly utilizes a non-castered wheel mounting member 50 of the nature shown in FIGS. 7a-7c. Alternatively, when the idler wheel is to be self-steering, a wheel mounting member 60 of the type shown in FIGS. 8a and 8b is used in place of member 50.

Figure 7A:
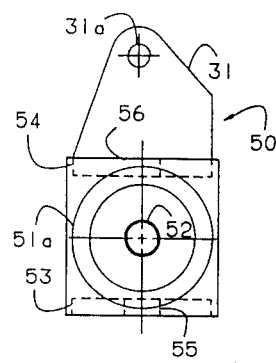
FIGS. 7a, 7b and 7c are top, side and end views, respectively, of a wheel-mounting member used to install a linkage-steered idler wheel.
Figure 7B:
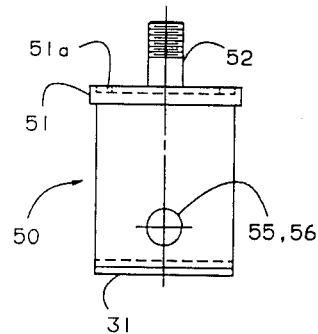
Figure 7C:
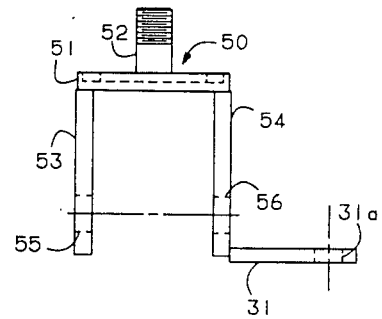

As seen in FIGS. 7a, 7b and 7c, a wheel mounting member 50 for mounting a linkage-steered idler wheel comprises an upper plate member 51 carrying an upstanding pivot shaft 52, a pair of depending side plates, 53, 54, and an attachment arm plate 31 to which link 27 (FIG. 1) is pivotally connected at hole 31a. Upper plate member 51 carries an annular groove 51a in which a thrust bearing fits. A pair of holes 55, 56 in side plates 53, 54 accommodate the axle (not shown) of a conventional idler wheel, so that the axis of such an axle lies directly below the idler wheel steering axis (i.e., the axis of shaft 52), as shown in FIG. 7b.

Figure 8A:
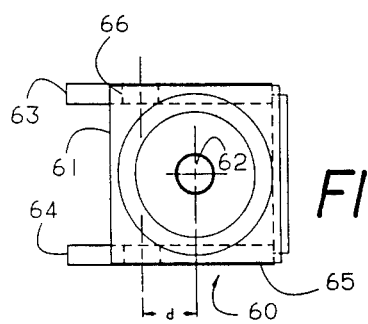
FIGS. 8a and 8b are top and side views, respectively, of a wheel-mounting member used to install a self-steered castered idler wheel.
Figure 8B:
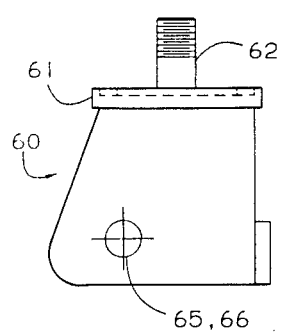

As shown in FIGS. 8a and 8b, the wheel mounting member 60 used for mounting a self-steering caster wheel is formed quite similarly with an upper plate member 61 carrying an upstanding steering shaft 62, and a pair of depending side plates 63, 64, but with arm 31 omitted because no link need be connected. Also, the idler wheel axle holes 65, 66 are offset (by dimension d, FIG. 8b) from the steering axis of shaft 62 to provide a desired amount of castering. From the above it will be seen that the same basic truck can be readily equipped for either linkage steering or caster steering of the sprung idler wheel, by mere selection of which form of wheel mounting member (50 or 60) is used for the idler wheel, and if the castered form of idler wheel is used, links 23 and 27 and crank 25, and their associated bearings are not installed.

Figure 9:
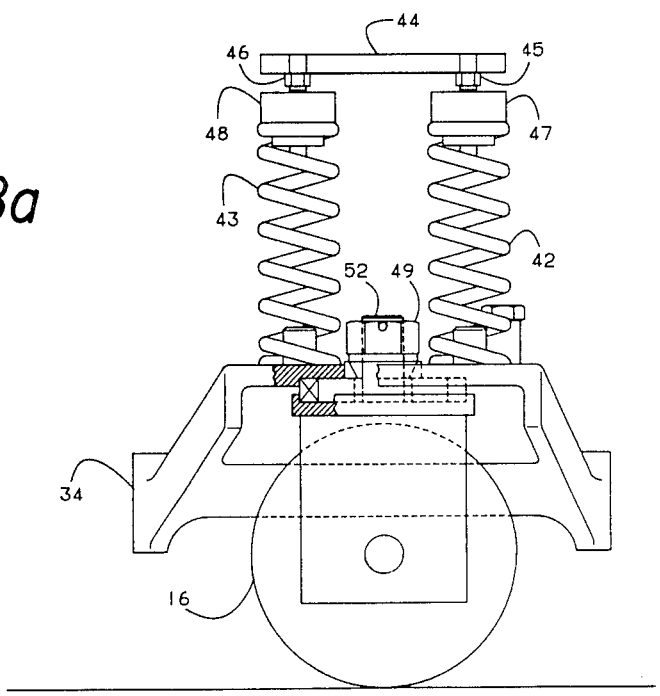
FIG. 9 is a view taken at lines 9—9 in FIG. 2, with certain parts omitted for sake of clarity.

A nut 49 is screwed onto the threaded upper portion of shaft 52 or shaft 62. As best seen in FIG. 9, adjustment of springs 42 and 43 is accomplished by rotation of bolts 45, 46. Bolts 45, 46 each have a hexagonal portion which may be readily grasped with a wrench, an upper portion which seats in a respective bore in plate 44, and a lower portion threaded into a respective spring retainer 47, 48, which seats in the top of one of the springs.

Figure 3:
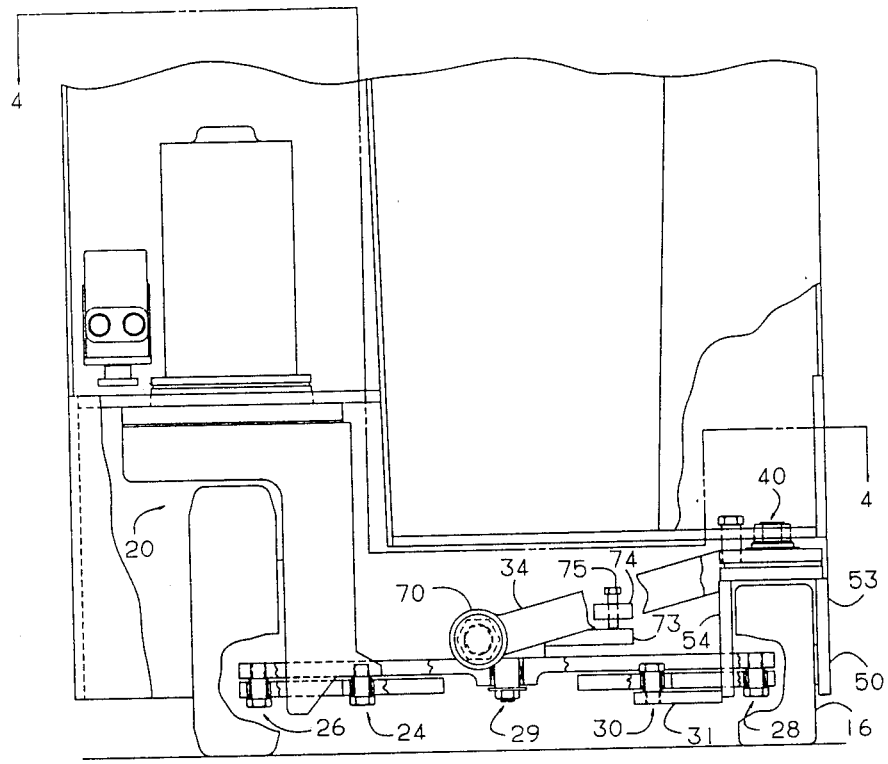
FIG. 3 is a rear elevation view generally similar to FIG. 1 illustrating one modified form of the invention.
Figure 4:
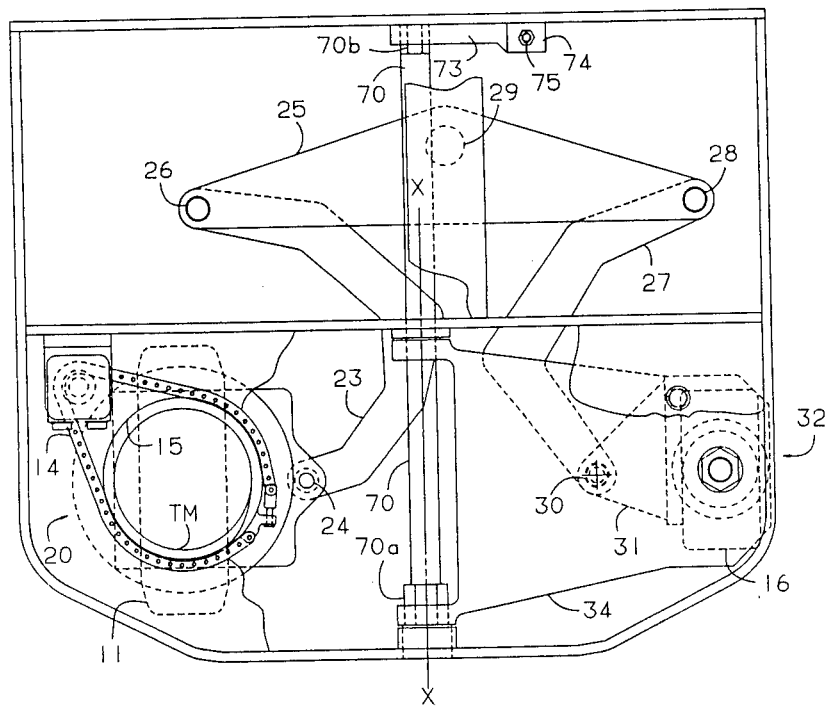
FIG. 4 is a downward section view taken at lines 4—4 in FIG. 3.

One modified form of the invention illustrated in Figs. 3 and 4 largely resembles the preferred form shown in FIGS. 1 and 2, differing principally in use of a torsion bar 70 in lieu of compression springs 42, 43 to resiliently spring A-frame lever member 34. As best seen in FIG. 4, one end 70a of a horizontally-extending torsion bar 70 has a non-circular shape engaging A-frame lever member 34. The other end 70b of bar 70 has a non-circular shape engaging an arm 73. A pad 74 affixed to the base frame of the truck carries a threaded bolt 75, which may be turned to adjust the torque which the torsion bar applies to lever member 34.

Figure 5:
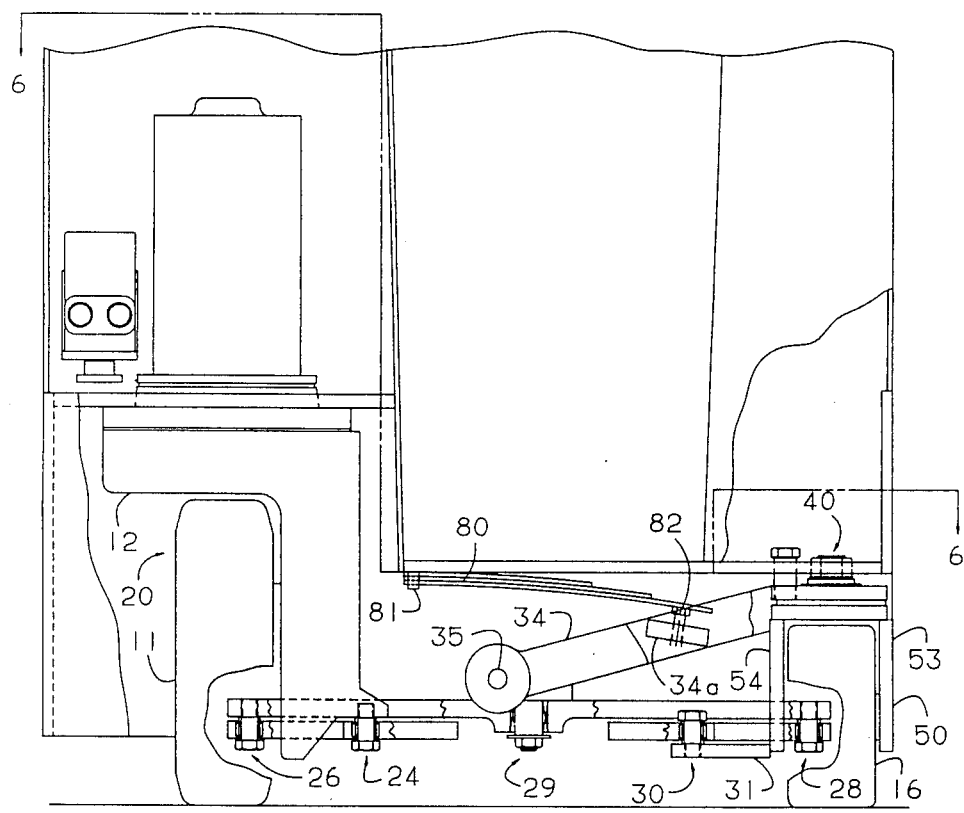
FIG. 5 is a rear elevation view generally similar to FIG. 1 illustrating another modified form of the invention.
Figure 6:
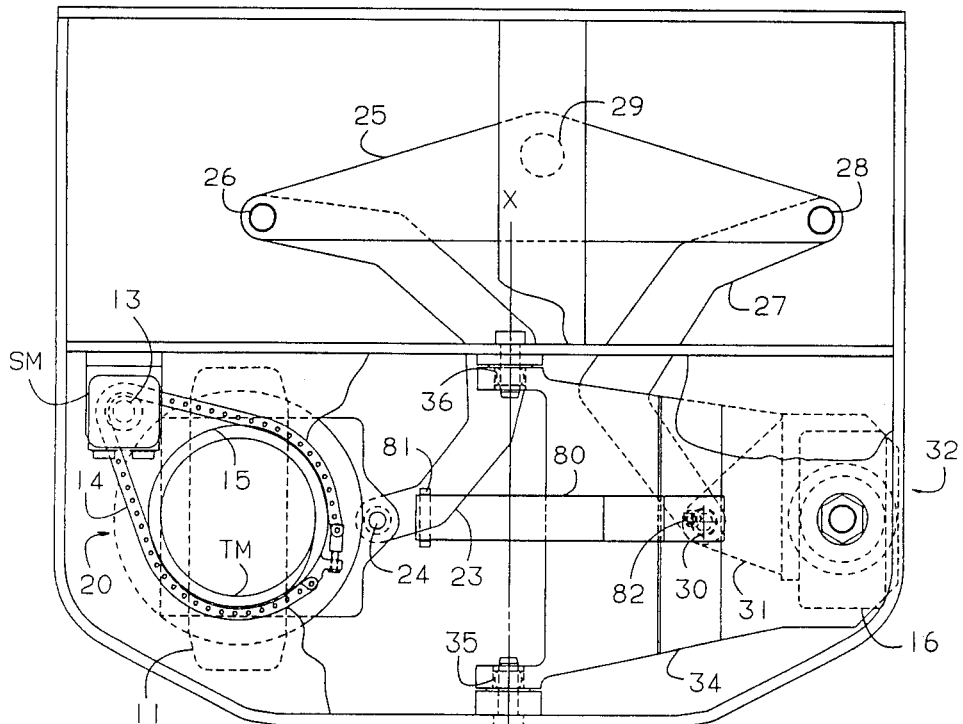
FIG. 6 is a downward section view taken at lines 6—6 in FIG. 5.

A further modified form of the invention illustrated in FIGS. 5 and 6 largely resembles the embodiments of FIGS. 1-4, differing principally in that a leaf spring assembly 80 is used to resiliently mount lever member 34 in lieu of coil springs or torsion bar means. The leaf spring assembly 80 is shown as comprising a plurality of leaves fixed to the base frame of the truck by clamp 81 and extending laterally with a downward component. A pad 34a on lever member 34 carries a threaded bolt 82 which engages the lowermost leaf of the leaf spring assembly. Increased upward force on idler wheel 16 deflects the leaves of assembly 80 upwardly.

The embodiments of FIGS. 3-4 and 5-6 can be seen to have the advantage of requiring space of very little height in order to spring mount an idler wheel assembly.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a lift truck having a base frame, a vertically-spring steerable idler wheel assembly carried on said base frame adjacent one rear corner of said truck and an unsprung steerable drive wheel assembly mounted adjacent an opposite rear corner of said truck, the improvement which comprises an arm having one of its ends pivotally connected to said base frame to allow limited rotation of said arm about a substantially horizontal longitudinally-extending axis, said idler wheel assembly being rotatably journaled on said arm adjacent the other end of said arm for rotation about a substantially vertical axis passing through a wheel on said vertically-spring steerable wheel assembly;

and spring means interposed between said arm and base frame to resiliently oppose upward movement of said other end of said arm.

2. The truck of claim 1 wherein said spring means includes at least one coil spring.

3. The truck of claim 1 wherein said spring means comprises a torsion bar spring.

4. The truck of claim 1 wherein said spring means comprises leaf spring means.

5. The truck of claim 1 having means for adjusting the spring force with which said spring means opposes said upward movement.

* * * * *